United States Patent
Feng et al.

(10) Patent No.: US 10,728,892 B2
(45) Date of Patent: Jul. 28, 2020

(54) METHOD AND DEVICE FOR SCHEDULING RESOURCES IN INTERNET OF VEHICLES SYSTEM

(71) Applicant: CHINA ACADEMY OF TELECOMMUNICATIONS TECHNOLOGY, Beijing (CN)

(72) Inventors: Yuan Feng, Beijing (CN); Li Zhao, Beijing (CN); Yi Zhao, Beijing (CN); Feng Li, Beijing (CN); Jiayi Fang, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 113 days.

(21) Appl. No.: 15/304,053

(22) PCT Filed: Apr. 14, 2015

(86) PCT No.: PCT/CN2015/076569
§ 371 (c)(1),
(2) Date: Oct. 13, 2016

(87) PCT Pub. No.: WO2015/158251
PCT Pub. Date: Oct. 22, 2015

(65) Prior Publication Data
US 2017/0041931 A1 Feb. 9, 2017

(30) Foreign Application Priority Data
Apr. 14, 2014 (CN) .......................... 2014 1 0148107

(51) Int. Cl.
H04W 72/04 (2009.01)
H04W 16/02 (2009.01)
H04W 72/12 (2009.01)

(52) U.S. Cl.
CPC ....... H04W 72/0446 (2013.01); H04W 16/02 (2013.01); H04W 72/121 (2013.01)

(58) Field of Classification Search
CPC .................................................. H04W 16/02
See application file for complete search history.

(56) References Cited

U.S. PATENT DOCUMENTS 8,165,098 B2 4/2012 Teo et al.
8,483,616 B1 7/2013 Hall et al.
(Continued)

FOREIGN PATENT DOCUMENTS

CN 1668134 A 9/2005
CN 101668295 A 3/2010
(Continued)

OTHER PUBLICATIONS

Extended European Search report for EP15780603.5 dated Apr. 5, 2017.
(Continued)

Primary Examiner — Kevin M Cunningham
(74) Attorney, Agent, or Firm — Ladas & Parry, LLP

(57) ABSTRACT

The present disclosure provides a method and a device for scheduling resources in an internet of vehicles system, to centrally allocate timeslot resources in the internet of vehicles system at a network side. The method includes: receiving, by a scheduling device, information of a geographical area reported by a first node and corresponding to the first node; and determining, by the scheduling device, timeslot resources capable of being scheduled within the geographical area reported by the first node, and allocating a timeslot resource from the determined timeslot resources for the first node. Each cell is divided into geographical areas, and an identical timeslot resource can be shared by non-adjacent geographical areas in an identical cell, and/or (Continued)

receiving, by a scheduling device, information of a geographical area reported by a first node and corresponding to the first node, each cell being divided into a plurality of geographical areas, and an identical timeslot resource being capable of being shared by non-adjacent geographical areas in an identical cell, and/or by the non-adjacent geographical areas in different cells — 51 determining, by the scheduling device, timeslot resources capable of being scheduled within the geographical area reported by the first node, and allocating a timeslot resource from the determined timeslot resources for the first node — 52 non-adjacent geographical areas in different cells. By centralized scheduling of timeslot resources, it is able to ensure communication between nodes within a predetermined range, thereby preventing impact of timeslot resources used by the nodes.

15 Claims, 4 Drawing Sheets

(56) References Cited

U.S. PATENT DOCUMENTS

| | | |
|---|---|---|
| 2007/0167191 A1 | 7/2007 | Carlsson |
| 2010/0075687 A1* | 3/2010 | Chayat ............... H04W 72/046 455/450 |
| 2011/0002284 A1* | 1/2011 | Talwar .................... H04L 12/66 370/329 |
| 2012/0157108 A1 | 6/2012 | Boudreau et al. |
| 2013/0064218 A1 | 3/2013 | Sunderesan et al. |
| 2013/0157676 A1 | 6/2013 | Baek et al. |
| 2014/0073338 A1* | 3/2014 | Lioulis ............. H04W 72/0446 455/452.1 |
| 2014/0323135 A1* | 10/2014 | Yang .................... H04W 48/02 455/438 |
| 2016/0374054 A1* | 12/2016 | Ma ....................... G08G 1/0112 |

FOREIGN PATENT DOCUMENTS

| | | |
|---|---|---|
| CN | 102088726 A | 6/2011 |
| EP | 2709413 A1 | 3/2014 |
| WO | 2011/071554 A1 | 6/2011 |
| WO | 2013/017295 A1 | 2/2013 |

OTHER PUBLICATIONS

Written Opinion of the International Search Authority for PCT/CN2015/076569 dated Jul. 9, 2015 and its English translation from WIPO.

International Preliminary Report on Patentability Chapter I dated Oct. 18, 2016 and its English translation from WIPO.

International Search Report for PCT/CN2015/076569 dated Jul. 9, 2015 and its English translation provided by WIPO.

Written Opinion of the International Search Authority for PCT/CN2015/076569 dated Jul. 9, 2015 and machine English translation from Bing.com translator.

From Chinese Application No. 201410148107.0, Office Action with Search Report dated Dec. 1, 2017 with English translation from associate.

* cited by examiner receiving, by a scheduling device, information of a geographical area reported by a first node and corresponding to the first node, each cell being divided into a plurality of geographical areas, and an identical timeslot resource being capable of being shared by non-adjacent geographical areas in an identical cell, and/or by the non-adjacent geographical areas in different cells  —51 determining, by the scheduling device, timeslot resources capable of being scheduled within the geographical area reported by the first node, and allocating a timeslot resource from the determined timeslot resources for the first node  —52

FIG. 5 determining, by a first node in the internet of vehicles system, a geographical area corresponding to position information of the first node in accordance with a correspondence between position information and geographical areas of a cell, each cell being divided into a plurality of geographical areas, and an identical timeslot resource being capable of being shared by non-adjacent geographical areas in an identical cell, and/or by non-adjacent geographical areas in different cells  —61 reporting, by the first node, information of the determined geographical area to a scheduling device  —62

FIG. 6

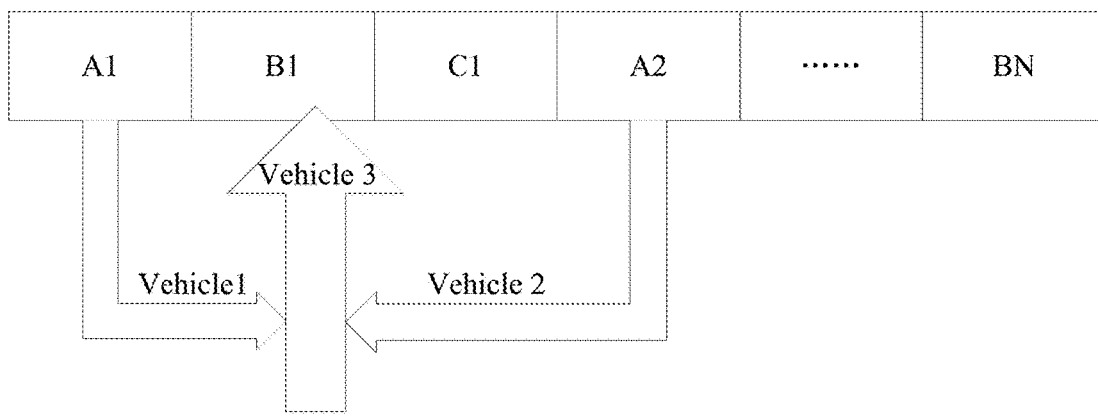

FIG. 7

METHOD AND DEVICE FOR SCHEDULING RESOURCES IN INTERNET OF VEHICLES SYSTEM

CROSS-REFERENCE TO RELATED APPLICATIONS

The present application is the U.S. national phase of PCT Application PCT/CN2015/076569 filed on Apr. 14, 2015, which claims the priority of the Chinese patent application No. 201410148107.0 filed on Apr. 14, 2014 and entitled "METHOD AND DEVICE FOR SCHEDULING RESOURCES IN INTERNET OF VEHICLES SYSTEM", which are incorporated herein by reference in their entireties.

TECHNICAL FIELD

The present disclosure relates to an internet of vehicles system, in particular to a method and a device for scheduling resources in an internet of vehicles system.

BACKGROUND

In a Long Term Evolution (LTE) system, Device to Device (D2D) communication is allowed to be performed directly between adjacent devices. For ease of description, a link for the direct communication between D2D terminals is called as a D2D link, and a cellular communication link between a network and the D2D terminal is called as a Device to Network (D2N) link. Network architecture is shown in FIG. 1.

Along with the development of the vehicle-mounted communication system and the mobile ad-hoc network, a dedicated short range communications (DSRC) technology has been developed, so as to perform dynamic and intelligent management on vehicles in real time. Through the DSRC, such information as position, speed, road environment and equipment state may be interchanged between vehicle nodes or between a vehicle node and a roadside node in a point-to-multipoint or point-to-point manner, so as to enable the vehicles, or the vehicle and a roadside information collection device, to communicate with each other. In the case that a dangerous road condition is sensed, an alarm may be sent to the vehicle in time, so as to prevent the occurrence of traffic accidents.

Currently, resources for the DSRC in the internet of vehicles system is allocated using a timeslot resource allocation algorithm based on timeslot reservation. Its basic concept will be described hereinafter. In the case that a node (e.g., a vehicle-mounted terminal) in the timeslot reservation system participates in a network, it is necessary to monitor idle timeslot resources within one frame, and then an idle timeslot may be selected as an occupied timeslot. In the case that the occupied timeslot resource is not abandoned by the node voluntarily, the node may use the occupied timeslot to transmit data all the time, and during this time period, this timeslot cannot be used by the other nodes.

In a word, a conventional timeslot resource allocation algorithm is performed completely through the interaction between the nodes, and there is no scheme for allocating the timeslot resources in the timeslot reservation system through centralized scheduling at a network side.

SUMMARY

An object of the present disclosure is to provide a method and a device for scheduling resources in an internet of vehicles system, so as to ensure the communication between the nodes within a predetermined range through the centralized scheduling of the timeslot resources, thereby to prevent the conflict of the timeslot resources used by the nodes.

The present disclosure provides in some embodiments a method for scheduling resources in an internet of vehicles system, including steps of: receiving, by a scheduling device, information of a geographical area reported by a first node and corresponding to the first node; and determining, by the scheduling device, timeslot resources capable of being scheduled within the geographical area reported by the first node, and allocating a timeslot resource from the determined timeslot resources for the first node. Each cell is divided into a plurality of geographical areas, and an identical timeslot resource is capable of being shared by non-adjacent geographical areas in an identical cell, and/or by non-adjacent geographical areas in different cells.

During the implementation, in a first application scenario, the step of receiving, by the scheduling device, the information of the geographical area reported by the first node and corresponding to the first node includes: receiving, by the scheduling device, information of a first geographical area reported by the first node, the first geographical area being a geographical area where the first node is located in the case that the first node initially accesses a network. The step of determining, by the scheduling device, the timeslot resources capable of being scheduled within the geographical area reported by the first node, and allocating a timeslot resource from the determined timeslot resources for the first node includes: determining, by the scheduling device, timeslot resources capable of being scheduled within the first geographical area, and allocating a timeslot resource from the timeslot resources capable of being scheduled within the first geographical area for the first node in accordance with a predetermined rule.

Further, the step of allocating, by the scheduling device, the timeslot source from the timeslot resources capable of being scheduled within the first geographical area for the first node in accordance with the predetermined rule includes: determining, by the scheduling device, a resource set corresponding to the first geographical area in accordance with a correspondence between geographical areas of the cell and resource sets, and allocating at least one timeslot resource in an idle state from the timeslot resources included in the resource set corresponding to the first geographical area for the first node, the resource sets corresponding to the geographical areas of each call, which do not share the same timeslot resource, including different timeslot resources; or, determining, by the scheduling device, a third geographical area closest to the first geographical area and capable of sharing the same timeslot resource with the first geographical area in accordance with the first geographical area, and allocating at least one timeslot resource from timeslot resources configured by the internet of vehicles system and not occupied by nodes within geographical areas between the first geographical area and the third geographical area for the first node.

Further, the step of allocating, by the scheduling device, at least one timeslot resource from the timeslot resources configured by the internet of vehicles system and not occupied by the nodes within the geographical areas between the first geographical area and the third geographical area for the first node includes: in the case that at least one geographical area of the geographical areas between the first geographical area and the third geographical area does not belong to the scheduling device, acquiring, by the scheduling device, timeslot resources occupied by nodes within the at least one geographical area through interaction with a scheduling device to which the at least one geographical area belongs.

During the implementation, in a second application scenario, the step of receiving, by the scheduling device, the information of the geographical area reported by the first node and corresponding to the first node includes: receiving, by the scheduling device, information of a second geographical area reported by the first node, the second geographical area being a geographical area which is located within an identical cell to the geographical area corresponding to a current position of the first node and to which the first node is to be switched, or a geographical area in an identical cell to which the first node has been switched. The step of determining, by the scheduling device, the timeslot resources capable of being scheduled within the geographical area reported by the first node and determining the timeslot resource from the determined timeslot resource for the first node includes: determining, by the scheduling device, timeslot resources capable of being scheduled within the second geographical area, and allocating a timeslot resource from the timeslot resources capable of being scheduled within the second geographical area for the first node in accordance with a predetermined rule.

Further, the step of allocating, by the scheduling device, the timeslot resource from the timeslot resources capable of being scheduled within the second geographical area for the first node in accordance with the predetermined rule includes: determining, by the scheduling device, a resource set corresponding to the second geographical area in accordance with a correspondence between geographical areas of the cell and resource sets, and allocating at least one timeslot resource in an idle state from the timeslot resources included in the resource set corresponding to the second geographical area for the first node; the resource sets corresponding to the geographical areas of each call, which do not share the same timeslot resource, including different timeslot resources; or, determining, by the scheduling device, a fourth geographical area closest to the second geographical area and capable of sharing the same timeslot resource with the second geographical area in accordance with the second geographical area, and determining whether or not the first node is capable of using the timeslot resource occupied by the first node within the second geographical area in accordance with the timeslot resources occupied by nodes within geographical areas between the second geographical area and the fourth geographical area.

Further, the step of determining, by the scheduling device, whether or not the first node is capable of using the timeslot resource occupied by the first node within the second geographical area in accordance with the timeslot resources occupied by the nodes within the geographical areas between the second geographical area and the fourth geographical area includes: in the case that a timeslot resource currently occupied by the first node has been occupied by the nodes within the geographical areas between the second geographical area and the fourth geographical area, determining, by the scheduling device, that the timeslot resource currently occupied by the first node is incapable of being used by the first node within the second geographical area, and allocating at least one timeslot resource from timeslot resource configured by the internet of vehicles system and not occupied by the nodes within the geographical area between the second geographical area and the fourth geographical area for the first node; or, in the case that the timeslot resource currently occupied by the first node has not yet been occupied by the nodes within the geographical areas between the second geographical area and the fourth geographical area, determining, by the scheduling device, that the first node is capable of using the timeslot resource currently occupied by the first node within the second geographical area.

Further, the step of allocating, by the scheduling device, at least one timeslot resource from the timeslot resources configured by the internet of vehicles system and not occupied by the nodes within the geographical areas between the second geographical area and the fourth geographical area for the first node includes: in the case that at least one geographical area of the geographical areas between the second geographical area and the fourth geographical area does not belong to the scheduling device, acquiring, by the scheduling device, timeslot resources occupied by nodes within the at least one geographical area through interaction with a scheduling device to which the at least one geographical area belongs.

During the implementation, when the second geographical area is a geographical area located within an identical cell to the geographical area corresponding to a current position of the first node and to which the first node is to be switched, subsequent to the step of allocating, by the scheduling device the timeslot resource for the first node, the method further includes: upon receiving, from the first node, a message that the first node has been switched to the second geographical area, updating, by the scheduling device, the timeslot resource currently occupied by the first node to a timeslot resource newly allocated for the first node by the scheduling device, and setting a state of the timeslot resource previously occupied by the first node within a previous geographical area corresponding to the first node into an idle state.

During the implementation, in a third application scenario, the method further includes: receiving, by the scheduling device, from the first node a first notification message that the first node is to leave a cell where the first node is currently located; and modifying, by the scheduling device, a state of the timeslot resource used by the first node within the geographical area of the cell where the first node is located before the switching into an idle state in accordance with the first notification message.

During the implementation, in a fourth application scenario, the method further includes: receiving, by the scheduling device, from the first node a second notification message that the first node is to be shut down; and modifying, by the scheduling device, a state of the timeslot resource used by the first node within the geographical area of the cell corresponding to a current position of the first node into an idle state in accordance with the second notification message.

In another aspect, the present disclosure provides in some embodiments a method for scheduling resources in an internet of vehicles system, including steps of: determining, by a first node in the internet of vehicles system, a geographical area corresponding to position information of the first node in accordance with a correspondence between position information and geographical areas of a cell; and reporting, by the first node, information of the determined geographical area to a scheduling device. Each cell is divided into a plurality of geographical areas, and an identical timeslot resource is capable of being shared by non-adjacent geographical areas in an identical cell, and/or by non-adjacent geographical areas in different cells.

During the implementation, in a first application scenario, the step of determining, by the first node, the geographical area corresponding to the position information of the first node in accordance with the correspondence between the position information and the geographical areas of the cell includes: in the case that the first node initially accesses a network, determining, by the first node, a first geographical area corresponding to a current position of the first node in accordance with correspondence between the position information and the geographical areas of the cell. The step of reporting, by the first node, the information of the determined geographical area to the scheduling device includes: reporting, by the first node, information of the first geographical area to the scheduling device.

During the implementation, subsequent to the step of reporting, by the first node, the information of the first geographical area to the scheduling device, the method further includes: receiving, by the first node, a timeslot resource allocated by the scheduling device for the first node within the first geographical area.

During the implementation, in a second application scenario, the step of reporting, by the first node, the information of the determined geographical area to the scheduling device includes: after the geographical area where the first node is currently located has been changed, reporting, by the first node, information of a second geographical area to the scheduling device, the second geographical area being a geographical area which is located within an identical cell to the geographical area corresponding to the current position of the first node and to which the first node is to be switched, or a geographical area in an identical cell to which the first node has been switched.

During the implementation, subsequent to the step of reporting, by the first node, the information of the second geographical area to the scheduling device, the method further includes: receiving, by the first node, a timeslot resource allocated by the scheduling device for the first node within the second geographical area.

During the implementation, in the case that the second geographical area is a geographical area which is located within an identical cell to the geographical area corresponding to the current position of the first node and to which the first node is to be switched, subsequent to the step of receiving, by the first node, the timeslot resource allocated by the scheduling device for the first node within the second geographical area, the method further includes: before the first node has been switched to the second geographical area, using, by the first node, the timeslot resources which have been allocated by the scheduling device for the first node within the geographical area where the first node is currently located; after the first node has been switched to the second geographical area, using, by the first node, the timeslot resource allocated by the scheduling device for the first node within the second geographical area, and sending to the scheduling device a message for notifying the scheduling device that the first node has been switched to the second geographical area.

During the implementation, in a third application scenario, the method further includes: after the first node determines that it needs to leave a cell where the first node is currently located, sending, by the first node, a first notification message to the scheduling device, and releasing the timeslot resource allocated by the scheduling device for the first node within the corresponding geographical area before the switching. The first notification message is used to notify the scheduling device that the first node is to leave the cell where the first node is currently located.

During the implementation, in a fourth application scenario, the method further includes: after the first node determines that it needs to be shut down, sending, by the first node, a second notification message to the scheduling device, and releasing the timeslot resource allocated by the scheduling device for the first node within the geographical area corresponding to the current position of the first node. The second notification message is used to notify the scheduling device that the first node is to be shut down.

In yet another aspect, the present disclosure provides in some embodiments a scheduling device for an internet of vehicles system, including: a reception module configured to receive information of a geographical area reported by a first node and corresponding to the first node; and a processing module configured to determine timeslot resources capable of being scheduled within the geographical area reported by the first node, and allocate a timeslot resource from the determined timeslot resources for the first node. Each cell is divided into a plurality of geographical areas, and an identical timeslot resource is capable of being shared by non-adjacent geographical areas in an identical cell, and/or by non-adjacent geographical areas in different cells.

During the implementation, in a first application scenario, the reception module is configured to receive information of a first geographical area reported by the first node, the first geographical area being a geographical area where the first node is located in the case that the first node initially accesses a network. The processing module is configured to determine timeslot resources capable of being scheduled within the first geographical area, and allocate a timeslot resource from the timeslot resources capable of being scheduled within the first geographical area for the first node in accordance with a predetermined rule.

Further, the processing module is configured to: determine a resource set corresponding to the first geographical area in accordance with a correspondence between geographical areas of the cell and resource sets, and allocate at least one timeslot resource in an idle state from the timeslot resources included in the resource set corresponding to the first geographical area for the first node, the resource sets corresponding to the geographical areas of each call, which do not share the same timeslot resource, including different timeslot resources; or, determine a third geographical area closest to the first geographical area and capable of sharing the same timeslot resource with the first geographical area in accordance with the first geographical area, and allocate at least one timeslot resource from timeslot resources configured by the internet of vehicles system and not occupied by nodes within a geographical area between the first geographical area and the third geographical area for the first node.

During the implementation, in the case that the processing module allocates at least one timeslot resource from the timeslot resources configured by the internet of vehicles system and not occupied by the nodes within geographical areas between the first geographical area and the third geographical area for the first node, the processing module is further configured to: in the case that at least one geographical area of the geographical areas between the first geographical area and the third geographical area does not belong to the scheduling device, acquire timeslot resources occupied by nodes within the at least one geographical area through interaction with a scheduling device to which the at least one geographical area belongs.

During the implementation, in a second application scenario, the reception module is configured to receive information of a second geographical area reported by the first node, the second geographical area being a geographical area which is located within an identical cell to the geographical area corresponding to a current position of the first node and to which the first node is to be switched, or a geographical area in an identical cell to which the first node has been switched. The processing module is configured to determine timeslot resources capable of being scheduled within the second geographical area, and allocate a timeslot resource from the timeslot resources capable of being scheduled within the second geographical area for the first node in accordance with a predetermined rule.

Further, the processing module is configured to: determine a resource set corresponding to the second geographical area in accordance with a correspondence between geographical areas of the cell and resource sets, and allocate at least one timeslot resource in an idle state from the timeslot resources included in the resource set corresponding to the second geographical area for the first node, the resource sets corresponding to the geographical areas of each call, which do not share the same timeslot resource, including different timeslot resources; or, determine a fourth geographical area closest to the second geographical area and capable of sharing the same timeslot resource with the second geographical area in accordance with the second geographical area, and determine whether or not the first node is capable of using the timeslot resource occupied by the first node within the second geographical area in accordance with the timeslot resources occupied by nodes within geographical areas between the second geographical area and the fourth geographical area.

Further, in the case that the processing module determines whether or not the first node is capable of using the timeslot resource occupied by the first node within the second geographical area in accordance with the timeslot resources occupied by the nodes within the geographical area between the second geographical area and the fourth geographical area, the processing module is configured to: in the case that a timeslot resource currently occupied by the first node has been occupied by the nodes within the geographical areas between the second geographical area and the fourth geographical area, determine that the timeslot resource currently occupied by the first node is incapable of being used by the first node within the second geographical area, and allocate at least one timeslot resource from timeslot resource configured by the internet of vehicles system and not occupied by the nodes within the geographical area between the second geographical area and the fourth geographical area for the first node; or, in the case that the timeslot resource currently occupied by the first node has not yet been occupied by the nodes within the geographical area between the second geographical area and the fourth geographical area, determine that the first node is capable of using the timeslot resource currently occupied by the first node within the second geographical area.

Further, in the case that the processing module allocates at least one timeslot resource from the timeslot resources configured by the internet of vehicles system and not occupied by the nodes within the geographical area between the second geographical area and the fourth geographical area for the first node, the processing module is configured to: in the case that at least one geographical area of the geographical areas between the second geographical area and the fourth geographical area does not belong to the scheduling device, acquire timeslot resources occupied by nodes within the at least one geographical area through interaction with a scheduling device to which the at least one geographical area belongs.

During the implementation, in the case that the second geographical area is a geographical area located within an identical cell to the geographical area corresponding to a current position of the first node and to which the first node is to be switched, the processing module is further configured to, after the reception module has received from the first node a message that the first node has been switched to the second geographical area, update the timeslot resource currently occupied by the first node to a timeslot resource newly allocated for the first node by the scheduling device, and set a state of the timeslot resource previously occupied by the first node within a previous geographical area corresponding to the first node into an idle state.

During the implementation, in a third application scenario, the reception module is further configured to: receive from the first node a first notification message that the first node is to leave a cell where the first node is currently located, and the processing module is further configured to modify a state of the timeslot resource used by the first node within the geographical area of the cell where the first node is located before the switching into an idle state in accordance with the first notification message.

During the implementation, in a fourth application scenario, the reception module is further configured to: receive from the first node a second notification message that the first node is to be shut down, and the processing module is further configured to modify a state of the timeslot resource used by the first node within the geographical area of the cell corresponding to a current position of the first node into an idle state in accordance with the second notification message.

In still yet another aspect, the present disclosure provides in some embodiments a first node for an internet of vehicles system, including: a determination module configured to determine a geographical area corresponding to position information of the first node in accordance with a correspondence between position information and geographical areas of a cell; and a transceiver module configured to report information of the geographical area determined by the determination module to a scheduling device. Each cell is divided into a plurality of geographical areas, and an identical timeslot resource is capable of being shared by non-adjacent geographical areas in an identical cell, and/or by non-adjacent geographical areas in different cells.

During the implementation, in a first application scenario, the determination module is configured to, in the case that the first node initially accesses a network, determine a first geographical area corresponding to a current position of the first node in accordance with correspondence between the position information and the geographical areas of the cell, and the transceiver module is configured to report information of the first geographical area to the scheduling device.

During the implementation, subsequent to reporting the information of the first geographical area to the scheduling device, the transceiver module is further configured to receive a timeslot resource allocated by the scheduling device for the first node within the first geographical area.

During the implementation, in a second application scenario, the transceiver module is configured to, after the determination module determines that the geographical area where the first node is currently located has been changed, report information of a second geographical area to the scheduling device, the second geographical area being a geographical area which is located within an identical cell to the geographical area corresponding to the current position of the first node and to which the first node is to be switched, or a geographical area in an identical cell to which the first node has been switched.

During the implementation, subsequent to reporting the information of the second geographical area to the scheduling device, the transceiver module is further configured to receive a timeslot resource allocated by the scheduling device for the first node within the second geographical area.

During the implementation, in the case that the second geographical area is a geographical area which is located within an identical cell to the geographical area corresponding to the current position of the first node and to which the first node is to be switched, the determination module is further configured to, before the first node has been switched to the second geographical area, use the timeslot resources which have been allocated by the scheduling device for the first node within the geographical area where the first node is currently located, and after the first node has been switched to the second geographical area, use the timeslot resource allocated by the scheduling device for the first node within the second geographical area. The transceiver module is further configured to send to the scheduling device a message for notifying the scheduling device that the first node has been switched to the second geographical area.

During the implementation, in a third application scenario, the determination module is further configured to determine that the first node needs to leave a cell where the first node is currently located, and release the timeslot resource allocated by the scheduling device for the first node within the corresponding geographical area before the switching. The transceiver module is further configured to, after the determination module determines that the first node needs to leave the cell where the first node is currently located, send a first notification message to the scheduling device. The first notification message is used to notify the scheduling device that the first node is about to leave the cell where the first node is currently located.

During the implementation, in a fourth application scenario, the determination module is further configured to determine that the first node needs to be shut down, and release the timeslot resource allocated by the scheduling device for the first node within the geographical area corresponding to the current position of the first node. The transceiver module is further configured to, after the determination module determines that the first node needs to be shut down, send a second notification message to the scheduling device. The second notification message is used to notify the scheduling device that the first node is about to be shut down.

According to the method and the device in the embodiments of the present disclosure, the timeslot resources may be allocated at a network side for the nodes in the internet of vehicles system. Through the centralized scheduling of the timeslot resources, it is able to ensure the communication between the nodes within a predetermined range, thereby to prevent the impact of the timeslot resources used by the nodes. In addition, the identical timeslot resource is capable of being shared by non-adjacent geographical areas in each cell or by non-adjacent geographical areas in different cells, so it is able to improve system capacity.

BRIEF DESCRIPTION OF THE DRAWINGS

FIG. 5 is a flow chart of a method for scheduling resources in an internet of vehicles system at a scheduling device side according to the present disclosure;
FIG. 6 is a flow chart of a method for scheduling resources in an internet of vehicles system at a first node side according to the present disclosure;
FIG. 7 is a schematic view showing division of geographical areas according to one embodiment of the present disclosure.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

At first, a network structure suitable for a method and a device in the embodiments of the present disclosure will be described hereinafter.

1. Tightly-Coupled Network Architecture

Under this architecture, a traffic-specific spectrum may be used by a D2D link, and a cellular spectrum may be used by a D2N link. Timeslot resources may be allocated for the D2D link through the D2N link, and a conventional sequence relationship or a newly-designed sequence relationship may be used. Optionally, the cellular spectrum may be used by both the D2D link and the D2N link, and the timeslot resources may be allocated for the D2D link through the D2N link. At this point, a sequence relationship of a conventional cellular system needs to be followed strictly.

Figure 1:
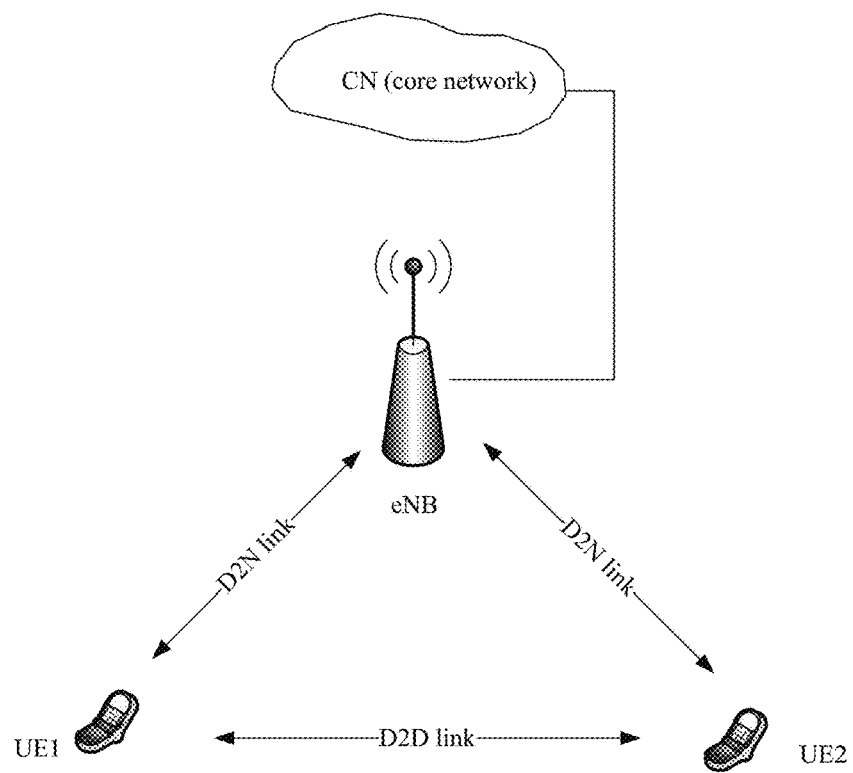
FIG. 1 is a schematic view showing network architecture for a conventional LTE system.
Figure 2:
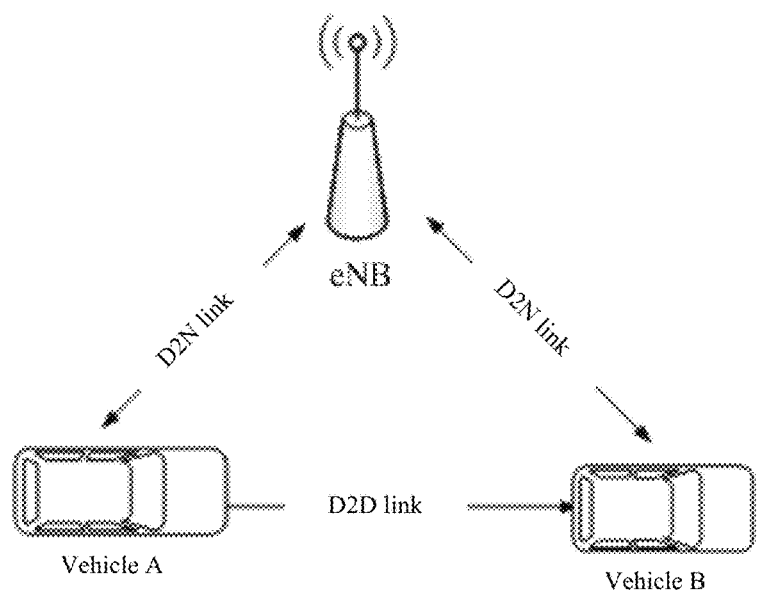
FIG. 2 is a schematic view showing a first network architecture according to the present disclosure.

Under this architecture, the scheduling device for allocating the timeslot resources for nodes may be a base station, which is similar to a standard cellular D2D terminal, as shown in FIG. 2. The scheduling device may also be a newly-added entity for controlling coverage areas of a plurality of base stations (at this point, the plurality of base stations may be used together for the resource allocation), and this entity may also be called as a base station hereinafter.

2. Loosely-Coupled Network Architecture

Figure 3:
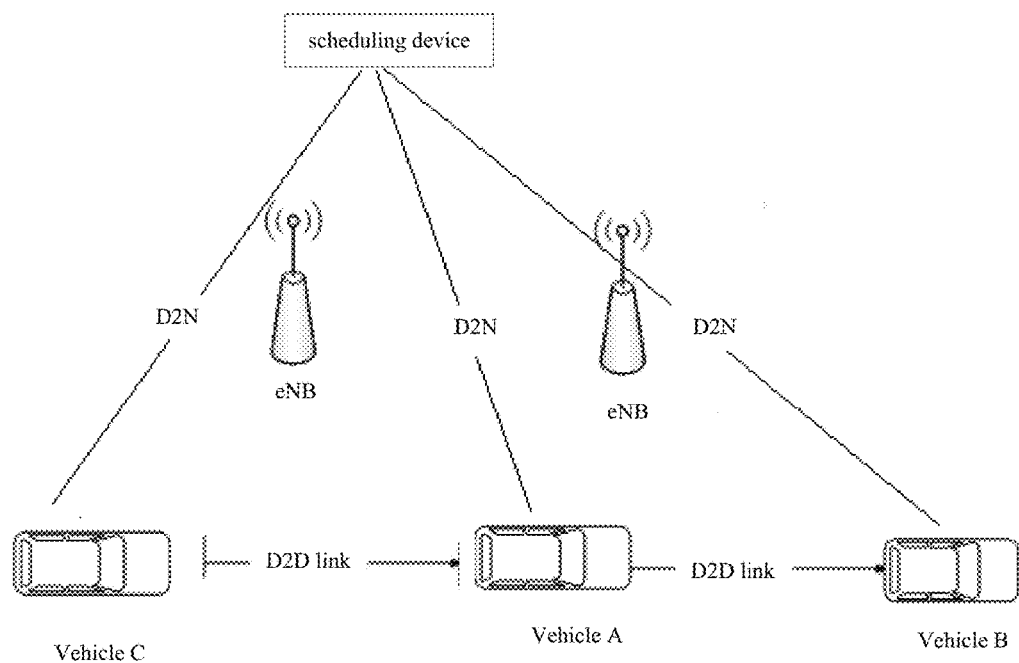
FIG. 3 is another schematic view showing a second network architecture according to the present disclosure.

Under this architecture, the scheduling device for allocating the timeslot resources for the nodes may be a base station, or a server at an internet protocol (IP) layer. FIG. 3 shows the network architecture.

There are two modes for this architecture.

(1) The resources for the D2D link may be scheduled on the basis of a user plane, i.e., the D2N link may use an IP channel, and at this point, the cellular spectrum or the traffic-specific spectrum may be used by the D2D link. In this mode, there is no strict sequence relationship between the D2D link and the D2N link. In this mode, the scheduling device may be a server at the IP layer.

(2) The traffic-specific spectrum, rather than the cellular link, is used by the D2N link and the D2D link. In this mode, it is unnecessary for the D2N link and the D2D link to follow a corresponding sequence relationship of an LTE system. The scheduling device may be a base station. The network architecture in this mode is similar to the tightly-coupled network architecture.

A sum of an internet of vehicles security message payload and an information security overhead is 3000 bit, each substantially accounting for 50%. In this way, the entire timeslot is substantially occupied by both the payload and the information security overhead. In other words, in the case that the resources are allocated by the base station, a granularity of the allocated timeslot resources includes all the timeslot resources within the entire timeslot.

In the embodiments of the present disclosure, each cell may be divided into a plurality of geographical areas. In other words, each cell may be divided into a plurality of geographical areas in accordance with geographical position information of the cell, so that a first node may merely report a geographical area corresponding to a position of the first node, rather than the specific position information. At this point, in the case that the geographical area where the first node is located does not change, it is unnecessary to report information of the geographical area. As a result, it is able to prevent the first node from frequently reporting information, thereby to reduce the system signaling overhead.

In the embodiments of the present disclosure, an identical timeslot resource is capable of being shared by non-adjacent geographical areas in an identical cell, and/or non-adjacent geographical areas in different cells, so as to improve system capacity. In order to prevent the interference, the same timeslot resource may not be shared by adjacent geographical areas in an identical cell, or by adjacent geographical areas in different cells.

During the implementation, the same timeslot resource capable of being shared by the non-adjacent geographical areas in each cell may include all the timeslot resources capable of being shared by all the non-adjacent geographical areas and the timeslot resources capable of being shared by parts of the non-adjacent geographical areas. In addition, the same timeslot resources capable of being shared by the non-adjacent geographical areas in different cells may also include all the timeslot resources capable of being shared by all the non-adjacent geographical areas and the timeslot resources capable of being shared by parts of the non-adjacent geographical areas.

Optionally, an identical timeslot resource is capable of being shared by parts of the non-adjacent geographical areas in each cell, and/or by parts of the non-adjacent geographical areas in different cells.

However, it does not mean that all the non-adjacent geographical areas can share the same timeslot resource. Whether or not the same timeslot resource can be shared by the non-adjacent geographical areas depends on distance information between the nodes. The distance information may be determined in accordance with a channel fading model and practical needs, and this distance may be added with a certain isolation degree (a small-scale fading effect). For example, in the case that the same timeslot resource is shared by two nodes separated from each other by 900 meters in accordance with the channel fading model, it may determine that all the nodes located between the two nodes and desired to perform communication may receive data reliably, and at this point, a resource-sharing distance may be set as 900 meters or increased by a certain isolation degree, e.g., set as 1000 meters.

Actually, the division of the geographical areas is just a coarse granularity processing, i.e., it is the same for a centralized scheduling entity whether a node is at one end of a geographical area or at another end of the geographical area. In this regard, the smaller the geographical area, the larger a resource sharing coefficient (the larger the system capacity), and the larger the overhead caused by reporting the position.

In the case that the geographical area is not bound to a timeslot, merely the resource-sharing distance may be used. At this point, the geographical areas may be divided, so as to reduce the overhead caused by reporting a position of the node. In the case of the acceptable overhead, the smaller the geographical area, the better.

In the case that the geographical area is bound to the timeslot, a larger geographical area is desired due to the association between the resources (i.e., static allocation of the resources). Because vehicles may be distributed unevenly, it is inappropriate to provide a too small geographical area.

Figure 4:
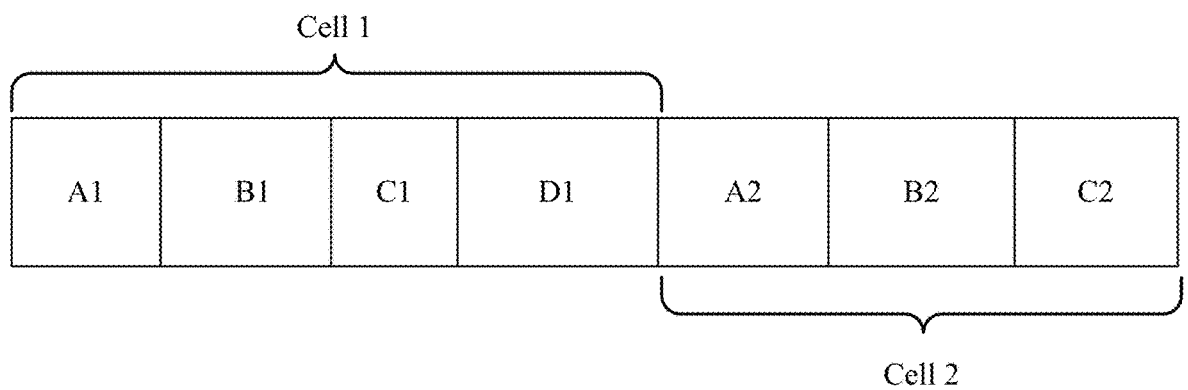
FIG. 4 is a schematic view showing division of geographical areas according to the present disclosure.

For example, as shown in FIG. 4, a cell 1 is divided into four geographical areas A1, B1, C1 and D1, and a cell 2 is divided into three geographical areas A2, B2 and C2. For an identical cell, an identical timeslot resource may not be shared by all the geographical areas in the cell 1, or by two non-adjacent geographical areas in the cell 1. For example, an identical timeslot resource may be shared by A1 and C1 (or A1 and D1), and an identical timeslot resource may be shared by B1 and D1. However, the same timeslot resource may not be shared by A1 and B1, or by B1 and C1, or by C1 and D1. Identically, an identical timeslot resource may not be shared by all the geographical areas in the cell 2, or by two non-adjacent geographical areas in the cell 2, e.g., the same timeslot resource may be shared by A2 and C2.

For another example, for different cells, the same timeslot resource may not be shared by all the geographical areas in the cell 1 and all the geographical areas in the cell 2, or the same timeslot resource may be shared by the non-adjacent geographical areas in the cell 1 and the cell 2. For instance, an identical timeslot resource may be shared by A1 and A2, or by B1 and B2, or by C1 and C2. However, D1 is located adjacent to A2, so an identical timeslot resource may not be shared by them.

For yet another example, an identical timeslot resource may be shared by the non-adjacent geographical areas in an identical cell, and by the non-adjacent geographical areas in different cells. For instance, an identical timeslot resource may be shared by A1, C1 and A2.

For each cell, the timeslot resources capable of being scheduled within each geographical area may be configured in the following two modes.

Mode 1: a resource set may be configured for each geographical area of the cell. Different timeslot resources may be included in the resource sets corresponding to the geographical areas which are incapable of sharing the same timeslot resource, and the geographical areas which are capable of sharing the same timeslot resource may correspond to an identical resource set, i.e., the timeslot resources capable of being scheduled within each geographical area are constant.

For example, 100 timeslot resources are configured for the internet of vehicles system, and the cell 1 is divided into four geographical areas A1, B1, C1 and D1. In the case that an identical timeslot resource is incapable of being shared by any two geographical areas in the cell, the 100 timeslot resources may be divided into four resource sets, different resource sets may include different timeslot resources, and one resource set may be configured for each geographical area. In the case that an identical timeslot resource is capable of being shared by the geographical areas A1 and D1 in the cell, the 100 timeslot resources may be divided into three resource sets for the geographical areas A1, B1 and C1 respectively, and the resource set configured for the geographical area D1 is identical to the resource set configured for the geographical area A1.

Mode 2: the timeslot resource capable of being scheduled within each geographical area in the cell include all the timeslot resources configured for the internet of vehicles system, except the timeslot resources occupied by the nodes within the other geographical areas which are incapable of sharing the same timeslot resource with the geographical area, i.e., the timeslot resources capable of being scheduled within each geographical area are dynamically changed.

For example, 100 timeslot resources (timeslots 1 to 100) are configured for the internet of vehicles system, the cell 1 is divided into four geographical areas A1, B1, C1 and D1, and the same timeslot resources are capable of being shared by the geographical areas A1 and D1. The timeslots 1 to 10 have been allocated for the nodes within the geographical area B1, and the timeslots 51 to 75 have been allocated for the nodes within the geographical area C1. Hence, the timeslot resources capable of being scheduled within the geographical area A1 include the timeslots 11 to 50, and 76 to 100, and the timeslot resources capable of being scheduled within the geographical area D1 are identical to those capable of being scheduled within the geographical area A1.

In this mode, the timeslot resources capable of being scheduled within the geographical areas in each cell may be divided in accordance with a channel mode, so as to enable the nodes in the internet of vehicles system to share the same timeslot resources within the geographical areas where the timeslot resources may be shared, without any timeslot conflict.

In the embodiments of the present disclosure, a first node may be any node in the internet of vehicles system, e.g., a vehicle-mounted device. The scheduling device may be a base station, or a server at an IP layer.

The present disclosure will be described hereinafter in conjunction with the drawings. It should be appreciated that, the following embodiments are used for illustrative and explanatory purposes only, but shall not be used to limit the scope of the present disclosure.

The present disclosure provides in some embodiments a method for scheduling resources in an internet of vehicles system at a scheduling device side. As shown in FIG. 5, the method includes the following steps.

Step 51: receiving, by a scheduling device, information of a geographical area reported by a first node and corresponding to the first node.

In this step, the information of the geographical area reported by the first node may include identification information of a cell to which the geographical cell belongs and identification information of the geographical area, so that the scheduling device may acquire the geographical area where the first node is located.

Step 52: determining, by the scheduling device, timeslot resources capable of being scheduled within the geographical area reported by the first node, and allocating a timeslot resource from the determined timeslot resources for the first node.

According to the embodiments of the present disclosure, the scheduling device may receive the information of the geographical area reported by the first node and corresponding to the first node, determine the timeslot resources capable of being scheduled within the geographical area reported by the first node, and allocate the timeslot resource from the determined timeslot resources for the first node, so as to provide a scheme for centrally allocating the timeslot resources for the nodes in the internet of vehicles system at a network side. Through the centralized scheduling of the timeslot resources, it is able to ensure the communication between the nodes within a predetermined range, thereby to prevent the impact of the timeslot resources used by the nodes. In addition, an identical timeslot resource is capable of being scheduled by the non-adjacent geographical areas in each cell, or by the non-adjacent geographical areas in different cells, so as to increase system capacity.

During the implementation, in a first application scenario, the scheduling device may allocate the timeslot resources for the first node in the case that the first node initially accesses a network. The details are given as follows.

Step 51 specifically includes: receiving, by the scheduling device, information of a first geographical area reported by the first node. The first geographical area is a geographical area where the first node is located in the case that the first node initially accesses the network.

Step 52 specifically includes: determining, by the scheduling device, timeslot resources capable of being scheduled within the first geographical area, and allocating a timeslot resource from the timeslot resources capable of being scheduled within the first geographical area for the first node in accordance with a predetermined rule.

In this scenario, Step 52 may be implemented in the following two ways.

1. In the case that the timeslot resources capable of being scheduled within the geographical area in each cell are configured in the above-mentioned mode 1, Step 52 may specifically include: determining, by the scheduling device, a resource set corresponding to the first geographical area in accordance with a correspondence between geographical areas of the cell and resource sets, and allocating at least one timeslot resource in an idle state from the timeslot resources included in the resource set corresponding to the first geographical area for the first node. The resource sets corresponding to the geographical areas of each cell, which do not share the same timeslot resource, may include different timeslot resources.

2. In the case that the timeslot resources capable of being scheduled within the geographical area in each cell are configured in the above-mentioned mode 2, Step 52 may specifically include: determining, by the scheduling device, a third geographical area closest to the first geographical area and capable of sharing the same timeslot resource with the first geographical area in accordance with the first geographical area, and allocating at least one timeslot resource from timeslot resources configured by the internet of vehicles system and not occupied by nodes within geographical areas between the first geographical area and the third geographical area for the first node.

In this way, the step of allocating, by the scheduling device, at least one timeslot resource from the timeslot resources configured by the internet of vehicles system and not occupied by the nodes within the geographical areas between the first geographical area and the third geographical area for the first node may include: in the case that at least one geographical area of the geographical areas between the first geographical area and the third geographical area does not belong to the scheduling device, acquiring, by the scheduling device, timeslot resources occupied by nodes within the at least one geographical area through interaction with a scheduling device to which the at least one geographical area belongs.

During the implementation, in a second application scenario, the scheduling device may allocate the timeslot resource for the first node in the case that the geographical area where the first node is located is changed.

To be specific, Step 51 may include: receiving, by the scheduling device, information of a second geographical area reported by the first node. The second geographical area is a geographical area which is located within an identical cell to the geographical area corresponding to a current position of the first node and to which the first node is to be switched, or a geographical area in an identical cell to which the first node has been switched.

Step 52 may include: determining, by the scheduling device, timeslot resources capable of being scheduled within the second geographical area, and allocating a timeslot resource from the timeslot resources capable of being scheduled within the second geographical area for the first node in accordance with a predetermined rule.

Further, Step 52 may be implemented in the following two ways.

1. In the case that the timeslot resources capable of being scheduled within the geographical areas in each cell are configured in the above-mentioned mode 1, Step 52 may specifically include: determining, by the scheduling device, a resource set corresponding to the second geographical area in accordance with a correspondence between geographical areas of the cell and resource sets, and allocating at least one timeslot resource in an idle state from the timeslot resources included in the resource set corresponding to the second geographical area for the first node. The resource sets corresponding to the geographical areas of each call, which do not share the same timeslot resource, includes different timeslot resources.

2. In the case that the timeslot resources capable of being scheduled within the geographical areas in each cell are configured in the above-mentioned mode 2, Step 52 may specifically include: determining, by the scheduling device, a fourth geographical area closest to the second geographical area and capable of sharing the same timeslot resource with the second geographical area in accordance with the second geographical area, and determining whether or not the first node is capable of using the timeslot resource occupied by the first node within the second geographical area in accordance with the timeslot resources occupied by nodes within geographical areas between the second geographical area and the fourth geographical area.

Further, in the case that a timeslot resource currently occupied by the first node has been occupied by the nodes within the geographical areas between the second geographical area and the fourth geographical area, the scheduling device may determine that the timeslot resource currently occupied by the first node is incapable of being used by the first node within the second geographical area, and allocate at least one timeslot resource from timeslot resource configured by the internet of vehicles system and not occupied by the nodes within the geographical areas between the second geographical area and the fourth geographical area for the first node.

In the case that the timeslot resource currently occupied by the first node has not yet been occupied by the nodes within the geographical areas between the second geographical area and the fourth geographical area, the scheduling device may determine that the first node is capable of using the timeslot resource currently occupied by the first node within the second geographical area. In this case, the scheduling device may not perform any processing.

In this way, the step of allocating, by the scheduling device, at least one timeslot resource from the timeslot resources configured by the internet of vehicles system and not occupied by the nodes within the geographical area between the second geographical area and the fourth geographical area for the first node includes: in the case that at least one geographical area of the geographical areas between the second geographical area and the fourth geographical area does not belong to the scheduling device, acquiring, by the scheduling device, timeslot resources occupied by nodes within the at least one geographical area through interaction with a scheduling device to which the at least one geographical area belongs.

In this scenario, in the case that the second geographical area is a geographical area located within an identical cell to the geographical area corresponding to a current position of the first node and to which the first node is to be switched, subsequent to the step of allocating, by the scheduling device the timeslot resource for the first node, the method further includes: upon receiving, from the first node, a message that the first node has been switched to the second geographical area, updating, by the scheduling device, the timeslot resource currently occupied by the first node to a timeslot resource newly allocated for the first node by the scheduling device, and setting a state of the timeslot resource previously occupied by the first node within a previous geographical area corresponding to the first node into an idle state. In other words, upon receiving, from the first node, the message that the first node has been switched to the second geographical area, the scheduling device needs to update the timeslot resource allocated for the first node.

During the implementation, in a third application scenario, the scheduling device may perform the following processings in the case that the first node is switched into a new cell: receiving from the first node a first notification message that the first node is to leave a cell where the first node is currently located; and modifying a state of the timeslot resource used by the first node within the geographical area of the cell where the first node is located before the switching into an idle state in accordance with the first notification message.

In this scenario, in the case that the first node leaves a current cell, i.e., a cell switching operation is performed by the first node, the scheduling device needs to update the state of the timeslot resource used by the first node within the geographical area of the cell where the first node is located before the switching.

During the implementation, in a fourth application scenario, the scheduling device may perform the following processings in the case that the first node is to be shut down: receiving from the first node a second notification message that the first node is to be shut down; and modifying a state of the timeslot resource used by the first node within the geographical area of the cell corresponding to a current position of the first node into an idle state in accordance with the second notification message.

In this scenario, in the case that the first node needs to be shut down, the scheduling device needs to update the state of the timeslot resource used by the first node within the geographical area of the cell where the first node is located before the shutdown.

Based on an identical inventive concept, the present disclosure provides in some embodiments a method for scheduling resources in an internet of vehicles system at a first node side. As shown in FIG. 6, the method includes the following steps.

Step 61: determining, by a first node in the internet of vehicles system, a geographical area corresponding to position information of the first node in accordance with a correspondence between position information and geographical areas of a cell.

Each cell is divided into a plurality of geographical areas, and an identical timeslot resource is capable of being shared by non-adjacent geographical areas in an identical cell, and/or by non-adjacent geographical areas in different cells.

Optionally, the first node may determine the geographical area corresponding to the position information of the first node in accordance with virtual electronic fence information.

The virtual electronic fence information is a subdivision concept for an LTE cell coverage area. The first node may look up the virtual electronic fence information in an online or offline mode.

Step 62: reporting, by the first node, information of the determined geographical area to a scheduling device.

In this step, the information of the geographical area reported by the first node may include identification information of a cell to which the geographical cell belongs and identification information of the geographical area, so that the scheduling device may acquire the geographical area where the first node is located.

According to the embodiments of the present disclosure, the first node may determine the geographical area corresponding to the position information of the first node in accordance with the correspondence between the position information and the geographical areas of the cell, and report the information of the determined geographical area to the scheduling device, so as to ensure the communication between the nodes within a predetermined range. In addition, an identical timeslot resource is capable of being scheduled by the non-adjacent geographical areas in each cell, and/or by the non-adjacent geographical areas in different cells, so as to increase system capacity.

During the implementation, in a first application scenario, the first node may report the information of a geographical area in a cell where the first node is currently located to the scheduling device in the case that the first node initially accesses a network. Details are given as follows.

Step 61 may specifically include: in the case that the first node initially accesses the network, determining, by the first node, a first geographical area corresponding to a current position of the first node in accordance with correspondence between the position information and the geographical areas of the cell. The first geographical area is just the geographical area in the cell where the first node is currently located.

Step 62 may specifically include: reporting, by the first node, information of the first geographical area to the scheduling device.

Optionally, the information of the first geographical area reported by the first node may include identification information of the cell to which the first geographical area belongs and identification information of the first geographical area.

In this scenario, subsequent to Step 62, the method may further include: receiving, by the first node, a timeslot resource allocated by the scheduling device for the first node within the first geographical area.

During the implementation, in a second application scenario, the first node may report the information of the geographical area to the scheduling device in the case that the geographical area where the first node is located is changed. Details are given as follows.

Step 62 may specifically include: after the geographical area where the first node is currently located has been changed, reporting, by the first node, information of a second geographical area to the scheduling device. The second geographical area is a geographical area which is located within an identical cell to the geographical area corresponding to the current position of the first node and to which the first node is to be switched, or a geographical area in an identical cell to which the first node has been switched.

In this scenario, in the case that the first node is capable of predicting, in accordance with its own trajectory and virtual electronic fence information, that the geographical area where the first node is located is to change, e.g., the first node moves from the current geographical area to any other geographical area in the same cell (i.e., the second geographical area), the first node may send a predicted-changing geographical area message to the scheduling device, and the information of the second geographical area to which the first node is to be switched may be carried in the message.

In the case that the first node is incapable of predicting that the geographical area where the first node is located is to change, the first node may, upon determining that it has been switched to the other geographical area in the same cell (i.e., the second geographical area), send a changing geographical area message to the scheduling device, and the information of the second geographical area to which the first node has been switched may be carried in the message.

In this scenario, after reporting the information of the second geographical area to the scheduling device, the first node may still use the original timeslot resource.

In this scenario, subsequent to Step 62, the method may further include: receiving, by the first node, a timeslot resource allocated by the scheduling device for the first node within the second geographical area.

Further, in the case that the second geographical area is a geographical area which is located within an identical cell to the geographical area corresponding to the current position of the first node and to which the first node is to be switched, subsequent to the step of receiving, by the first node, the timeslot resource allocated by the scheduling device for the first node within the second geographical area, the method further includes: before the first node has been switched to the second geographical area, using, by the first node, the timeslot resources which have been allocated by the scheduling device for the first node within the geographical area where the first node is currently located; after the first node has been switched to the second geographical area, using, by the first node, the timeslot resource allocated by the scheduling device for the first node within the second geographical area, and sending to the scheduling device a message for notifying the scheduling device that the first node has been switched to the second geographical area.

In the case that the second geographical area is the other geographical area in the same cell to which the first node has been switched, subsequent to the step of receiving, by the first node, the timeslot resource allocated by the scheduling device for the first node within the second geographical area, the method may further include: using, by the first node, the timeslot resource allocated by the scheduling device for the first node within the second geographical area.

In this scenario, subsequent to Step 62, in the case that the first node fails to receive the timeslot resource allocated by the scheduling device for the first node within the second geographical area, the first node may continue to use the original timeslot resource.

During the implementation, in a third application scenario, the processing after the first node determines that it needs to leave a cell where the first node is currently located, is as follows.

The method may further include: after the first node determines that it needs to leave a cell where the first node is currently located, sending, by the first node, a first notification message to the scheduling device, and releasing the timeslot resource allocated by the scheduling device for the first node within the corresponding geographical area before the switching. The first notification message is used to notify the scheduling device that the first node is to leave the cell where the first node is currently located.

During the implementation, in a fourth application scenario, the processing after the first node determines that it needs to be shut down, is as follows.

The method further includes: after the first node determines that it needs to be shut down, sending, by the first node, a second notification message to the scheduling device, and releasing the timeslot resource allocated by the scheduling device for the first node within the geographical area corresponding to the current position of the first node. The second notification message is used to notify the scheduling device that the first node is to be shut down.

The resource scheduling method will be described herein in conjunction with the following two examples.

First Example: Division of Geographical Areas

It is supposed that, each cell may be divided into three geographical areas, i.e., the geographical areas in cell 1 includes {A1, B1, C1}, the geographical areas in cell 2 includes {A2, B2, C2}, . . . , and the geographical areas in cell N includes {AN, BN, CN}. An identical timeslot resource is capable of being shared by the geographical areas A1, A2, . . . , and AN, an identical timeslot resource is capable of being shared by the geographical areas B1, B2, . . . , and BN, and an identical timeslot resource is capable of being shared by the geographical areas C1, C2, . . . , and CN. In the case that the timeslot resources capable of being scheduled by each geographical area are configured by a base station, it is necessary to ensure that an identical timeslot resource may be shared by a node 11 within the geographical area A1 and a node 2 within the geographical area A2. In the case that information are sent by a vehicle 1 and a vehicle 2 simultaneously, a vehicle 3 within the geographical area B1 may merely decode the information from the vehicle 1 accurately, i.e., decode the information from the node within a geographical area closest to the geographical area where the vehicle 3 is located.

Second Example: Resource Request Procedure of Node A in the Case of a Change in the Geographical Area Taking the geographical areas in FIG. 7 as an example, after the node A enters the cell, it may determine that it is currently located within the geographical area A1 in accordance with Global Positioning System (GPS) information and the virtual electronic fence information. At this point, the node A may report its own position information (i.e., information of the geographical area A1) to the base station, and meanwhile request the timeslot resource from the base station. The base station may allocate a timeslot resource, e.g., a timeslot 2, for the node A in accordance with a current timeslot occupation status. Hence, the timeslot 2 is occupied by the node A, and it is unnecessary for the node A to report the position information to the base station as long as the node A is still located within the geographical area A1.

In the case that the node A moves from the geographical area A1 to the geographical area B1, it may send a changing geographical area message to the base station. In the case that the base station has received the message and determines that the timeslot 2 is not occupied by the other nodes within the geographical areas {B1, C1, A2}, the base station may determine that the node A may continue to use the timeslot 2, and the timeslot resource used by the node A may not be changed. In the case that the base station determines that the timeslot 2 has been used by the node within the geographical areas {B1, C1, A2}, the base station may determine that the node A cannot continue to use the timeslot 2, and re-allocate a new timeslot resource for the node A.

The above method may be implemented via a software program stored in a storage medium. The stored software program may be called so as to perform the above-mentioned method.

Figure 8:
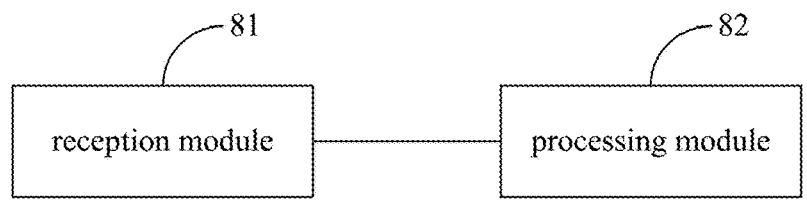
FIG. 8 is a schematic view showing a scheduling device according to the present disclosure.

Based on an identical inventive concept, the present disclosure further provides in some embodiments a scheduling device for an internet of vehicles system. As shown in FIG. 8, the scheduling device includes: a reception module 81 configured to receive information of a geographical area reported by a first node and corresponding to the first node; and a processing module 82 configured to determine timeslot resources capable of being scheduled within the geographical area reported by the first node, and allocate a timeslot resource from the determined timeslot resources for the first node.

Each cell is divided into a plurality of geographical areas, and an identical timeslot resource is capable of being shared by non-adjacent geographical areas in an identical cell, and/or by non-adjacent geographical areas in different cells.

According to the scheduling device in the embodiments of the present disclosure, the timeslot resources may be centrally allocated for the nodes in the internet of vehicles system, so as to ensure the communication between the nodes within a predetermined range, thereby to prevent the impact of the timeslot resources used by the nodes. In addition, the identical timeslot resource is capable of being shared by the non-adjacent geographical areas in each cell or by the non-adjacent geographical areas in different cells, so it is able to improve the system capacity.

During the implementation, in a first application scenario, the reception module 81 is configured to receive information of a first geographical area reported by the first node. The first geographical area is a geographical area where the first node is located in the case that the first node initially accesses a network.

The processing module 82 is configured to determine timeslot resources capable of being scheduled within the first geographical area, and allocate a timeslot resource from the timeslot resources capable of being scheduled within the first geographical area for the first node in accordance with a predetermined rule.

Further, the processing module 82 is configured to:

determine a resource set corresponding to the first geographical area in accordance with a correspondence between geographical areas of the cell and resource sets, and allocate at least one timeslot resource in an idle state from the timeslot resources included in the resource set corresponding to the first geographical area for the first node; the resource sets corresponding to the geographical areas of each call, which do not share the same timeslot resource, including different timeslot resources; or, determine a third geographical area closest to the first geographical area and capable of sharing the same timeslot resource with the first geographical area in accordance with the first geographical area, and allocate at least one timeslot resource from timeslot resources configured by the internet of vehicles system and not occupied by nodes within geographical areas between the first geographical area and the third geographical area for the first node.

Optionally, in the case that the processing module 82 allocates at least one timeslot resource from the timeslot resources configured by the internet of vehicles system and not occupied by the nodes within geographical areas between the first geographical area and the third geographical area for the first node, the processing module 82 is further configured to: in the case that at least one geographical area of the geographical areas between the first geographical area and the third geographical area does not belong to the scheduling device, acquire timeslot resources occupied by nodes within the at least one geographical area through interaction with a scheduling device to which the at least one geographical area belongs.

During the implementation, in a second application scenario, the reception module 81 is configured to receive information of a second geographical area reported by the first node. The second geographical area is a geographical area which is located within an identical cell to the geographical area corresponding to a current position of the first node and to which the first node is to be switched, or a geographical area in an identical cell to which the first node has been switched.

The processing module 82 is configured to determine timeslot resources capable of being scheduled within the second geographical area, and allocate a timeslot resource from the timeslot resources capable of being scheduled within the second geographical area for the first node in accordance with a predetermined rule.

Further, the processing module 82 is configured to:

determine a resource set corresponding to the second geographical area in accordance with a correspondence between geographical areas of the cell and resource sets, and allocate at least one timeslot resource in an idle state from the timeslot resources included in the resource set corresponding to the second geographical area for the first node; the resource sets corresponding to the geographical areas of each call, which do not share the same timeslot resource, including different timeslot resources; or, determine a fourth geographical area closest to the second geographical area and capable of sharing the same timeslot resource with the second geographical area in accordance with the second geographical area, and determine whether or not the first node is capable of using the timeslot resource occupied by the first node within the second geographical area in accordance with the timeslot resources occupied by nodes within geographical areas between the second geographical area and the fourth geographical area.

Further, in the case that the processing module 82 determines whether or not the first node is capable of using the timeslot resource occupied by the first node within the second geographical area in accordance with the timeslot resources occupied by the nodes within the geographical areas between the second geographical area and the fourth geographical area, the processing module 82 is configured to:

in the case that a timeslot resource currently occupied by the first node has been occupied by the nodes within the geographical areas between the second geographical area and the fourth geographical area, determine that the timeslot resource currently occupied by the first node is incapable of being used by the first node within the second geographical area, and allocate at least one timeslot resource from timeslot resource configured by the internet of vehicles system and not occupied by the nodes within the geographical areas between the second geographical area and the fourth geographical area for the first node; or, in the case that the timeslot resource currently occupied by the first node has not yet been occupied by the nodes within the geographical areas between the second geographical area and the fourth geographical area, determine that the first node is capable of using the timeslot resource currently occupied by the first node within the second geographical area.

Optionally, in the case that the processing module 82 allocates at least one timeslot resource from the timeslot resources configured by the internet of vehicles system and not occupied by the nodes within the geographical area between the second geographical area and the fourth geographical area for the first node, the processing module 82 is configured to: in the case that at least one geographical area of the geographical areas between the second geographical area and the fourth geographical area does not belong to the scheduling device, acquire timeslot resources occupied by nodes within the at least one geographical area through interaction with a scheduling device to which the at least one geographical area belongs.

In this scenario, in the case that the second geographical area is a geographical area located within an identical cell to the geographical area corresponding to a current position of the first node and to which the first node is to be switched, the processing module 82 is further configured to, after the reception module 81 has received from the first node a message that the first node has been switched to the second geographical area, update the timeslot resource currently occupied by the first node to a timeslot resource newly allocated for the first node by the scheduling device, and set a state of the timeslot resource previously occupied by the first node within a previous geographical area corresponding to the first node into an idle state.

During the implementation, in a third application scenario, the reception module 81 is further configured to: receive from the first node a first notification message that the first node is to leave a cell where the first node is currently located. The processing module 82 is further configured to modify a state of the timeslot resource used by the first node within the geographical area of the cell where the first node is located before the switching into an idle state in accordance with the first notification message.

During the implementation, in a fourth application scenario, the reception module 81 is further configured to: receive from the first node a second notification message that the first node is to be shut down. The processing module 82 is further configured to modify a state of the timeslot resource used by the first node within the geographical area of the cell corresponding to a current position of the first node into an idle state in accordance with the second notification message.

Figure 9:
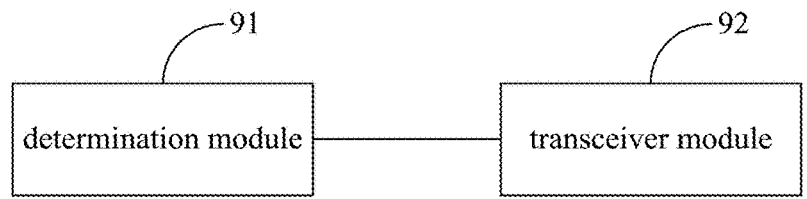
FIG. 9 is a schematic view showing a first node according to the present disclosure.

Based on an identical inventive concept, the present disclosure further provides in some embodiments a first node in an internet of vehicles system. The first node may be any node in the internet of vehicles system, e.g., a vehicle-mounted device. As shown in FIG. 9, the first node includes:

a determination module 91 configured to determine a geographical area corresponding to position information of the first node in accordance with a correspondence between position information and geographical areas of a cell; and a transceiver module 92 configured to report information of the geographical area determined by the determination module 91 to a scheduling device.

Each cell is divided into a plurality of geographical areas, and an identical timeslot resource is capable of being shared by the non-adjacent geographical areas in an identical cell, and/or by the non-adjacent geographical areas in different cells.

During the implementation, in a first application scenario, the determination module 91 is configured to, in the case that the first node initially accesses a network, determine a first geographical area corresponding to a current position of the first node in accordance with correspondence between the position information and the geographical areas of the cell.

The transceiver module 92 is configured to report information of the first geographical area to the scheduling device.

In this scenario, subsequent to reporting the information of the first geographical area to the scheduling device, the transceiver module 92 is further configured to receive a timeslot resource allocated by the scheduling device for the first node within the first geographical area.

During the implementation, in a second application scenario, the transceiver module 92 is configured to, after the determination module 91 determines that the geographical area where the first node is currently located has been changed, report information of a second geographical area to the scheduling device. The second geographical area is a geographical area, which is determined by the transceiver module 92, and which is located within an identical cell to the geographical area corresponding to the current position of the first node and to which the first node is to be switched, or a geographical area in an identical cell to which the first node has been switched.

Further, subsequent to reporting the information of the second geographical area to the scheduling device, the transceiver module 92 is further configured to receive a timeslot resource allocated by the scheduling device for the first node within the second geographical area.

In this scenario, in the case that the second geographical area is a geographical area which is determined by the determination module 91, and which is located within an identical cell to the geographical area corresponding to the current position of the first node and to which the first node is to be switched, the determination module 91 is further configured to, before the first node has been switched to the second geographical area, use the timeslot resources which have been allocated by the scheduling device for the first node within the geographical area where the first node is currently located; and after the first node has been switched to the second geographical area, use the timeslot resource allocated by the scheduling device for the first node within the second geographical area.

The transceiver module 92 is further configured to send to the scheduling device a message for notifying the scheduling device that the first node has been switched to the second geographical area.

During the implementation, in a third application scenario, the determination module 91 is further configured to determine that the first node needs to leave a cell where the first node is currently located, and release the timeslot resource allocated by the scheduling device for the first node within the corresponding geographical area before the switching.

The transceiver module 92 is further configured to, after the determination module 91 determines that the first node needs to leave the cell where the first node is currently located, send a first notification message to the scheduling device. The first notification message is used to notify the scheduling device that the first node is to leave the cell where the first node is currently located.

During the implementation, in a fourth application scenario, the determination module 91 is further configured to determine that the first node needs to be shut down, and release the timeslot resource allocated by the scheduling device for the first node within the geographical area corresponding to the current position of the first node.

The transceiver module 92 is further configured to, after the determination module determines that the first node needs to be shut down, send a second notification message to the scheduling device. The second notification message is used to notify the scheduling device that the first node is to be shut down.

The structure and the processing procedure of the scheduling device will be described hereinafter by taking a base station as an example in conjunction with a possible hardware structure.

Figure 10:
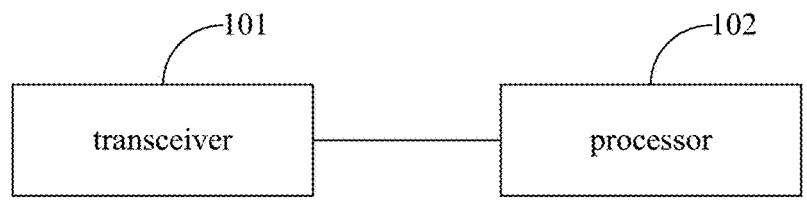
FIG. 10 is a schematic view showing a base station according to the present disclosure.

As shown in FIG. 10, the base station includes a transceiver 101, and at least one processor 102 connected to the transceiver 101.

The transceiver 101 is configured to receive information of a geographical area reported by a first node and corresponding to the first node.

The processor 102 is configured to determine timeslot resources capable of being scheduled within the geographical area reported by the first node, and allocate a timeslot resource from the determined timeslot resources for the first node.

Each cell is divided into a plurality of geographical areas, and an identical timeslot resource is capable of being shared by the non-adjacent geographical areas in an identical cell, and/or by the non-adjacent geographical areas in different cells.

During the implementation, in a first application scenario, the transceiver 101 is configured to receive information of a first geographical area reported by the first node. The first geographical area is a geographical area where the first node is located in the case that the first node initially accesses a network.

The processor 102 is configured to determine timeslot resources capable of being scheduled within the first geographical area, and allocate a timeslot resource from the timeslot resources capable of being scheduled within the first geographical area for the first node in accordance with a predetermined rule.

Further, the processor 102 is configured to:

determine a resource set corresponding to the first geographical area in accordance with a correspondence between geographical areas of the cell and resource sets, and allocate at least one timeslot resource in an idle state from the timeslot resources included in the resource set corresponding to the first geographical area for the first node; the resource sets corresponding to the geographical areas of each call, which do not share the same timeslot resource, including different timeslot resources; or determine a third geographical area closest to the first geographical area and capable of sharing the same timeslot resource with the first geographical area in accordance with the first geographical area, and allocate at least one timeslot resource from timeslot resources configured by the internet of vehicles system and not occupied by nodes within geographical areas between the first geographical area and the third geographical area for the first node.

Optionally, in the case that the processor 102 allocates at least one timeslot resource from the timeslot resources configured by the internet of vehicles system and not occupied by the nodes within the geographical areas between the first geographical area and the third geographical area for the first node, the processor 102 is further configured to: in the case that at least one geographical area of the geographical areas between the first geographical area and the third geographical area does not belong to the scheduling device, acquire timeslot resources occupied by nodes within the at least one geographical area through interaction with a scheduling device to which the at least one geographical area belongs.

During the implementation, in a second application scenario, the transceiver 101 is configured to receive information of a second geographical area reported by the first node. The second geographical area is a geographical area which is located within an identical cell to the geographical area corresponding to a current position of the first node and to which the first node is to be switched, or a geographical area in an identical cell to which the first node has been switched.

The processor 102 is configured to determine timeslot resources capable of being scheduled within the second geographical area, and allocate a timeslot resource from the timeslot resources capable of being scheduled within the second geographical area for the first node in accordance with a predetermined rule.

Further, the processor 102 is configured to:

determine a resource set corresponding to the second geographical area in accordance with a correspondence between geographical areas of the cell and resource sets, and allocate at least one timeslot resource in an idle state from the timeslot resources included in the resource set corresponding to the second geographical area for the first node; the resource sets corresponding to the geographical areas of each call, which do not share the same timeslot resource, including different timeslot resources; or, determine a fourth geographical area closest to the second geographical area and capable of sharing the same timeslot resource with the second geographical area in accordance with the second geographical area, and determine whether or not the first node is capable of using the timeslot resource occupied by the first node within the second geographical area in accordance with the timeslot resources occupied by nodes within geographical areas between the second geographical area and the fourth geographical area.

Further, in the case that the processor 102 determines whether or not the first node is capable of using the timeslot resource occupied by the first node within the second geographical area in accordance with the timeslot resources occupied by the nodes within the geographical areas between the second geographical area and the fourth geographical area, the processor 102 is configured to:

in the case that a timeslot resource currently occupied by the first node has been occupied by the nodes within the geographical areas between the second geographical area and the fourth geographical area, determine that the timeslot resource currently occupied by the first node is incapable of being used by the first node within the second geographical area, and allocate at least one timeslot resource from timeslot resource configured by the internet of vehicles system and not occupied by the nodes within the geographical areas between the second geographical area and the fourth geographical area for the first node; or, in the case that the timeslot resource currently occupied by the first node has not yet been occupied by the nodes within the geographical areas between the second geographical area and the fourth geographical area, determine that the first node is capable of using the timeslot resource currently occupied by the first node within the second geographical area.

Optionally, in the case that the processor 102 allocates at least one timeslot resource from the timeslot resources configured by the internet of vehicles system and not occupied by the nodes within the geographical areas between the second geographical area and the fourth geographical area for the first node, the processing module is configured to: in the case that at least one geographical area of the geographical areas between the second geographical area and the fourth geographical area does not belong to the scheduling device, acquire timeslot resources occupied by nodes within the at least one geographical area through interaction with a scheduling device to which the at least one geographical area belongs.

In this scenario, in the case that the second geographical area is a geographical area located within an identical cell to the geographical area corresponding to a current position of the first node and to which the first node is to be switched, the processor 102 is further configured to, after the transceiver 101 has received from the first node a message that the first node has been switched to the second geographical area, update the timeslot resource currently occupied by the first node to a timeslot resource newly allocated for the first node by the scheduling device, and set a state of the timeslot resource previously occupied by the first node within a previous geographical area corresponding to the first node into an idle state.

During the implementation, in a third application scenario, the transceiver 101 is further configured to: receive from the first node a first notification message that the first node is to leave a cell where the first node is currently located.

The processor 102 is further configured to modify a state of the timeslot resource used by the first node within the geographical area of the cell where the first node is located before the switching into an idle state in accordance with the first notification message.

During the implementation, in a fourth application scenario, the transceiver 101 is further configured to: receive from the first node a second notification message that the first node is about to be shut down.

The processor 102 is further configured to modify a state of the timeslot resource used by the first node within the geographical area of the cell corresponding to a current position of the first node into an idle state in accordance with the second notification message.

The structure and the processing procedure of the first node (any node in the internet of vehicles system) will be described hereinafter in conjunction with a possible hardware structure.

Figure 11:
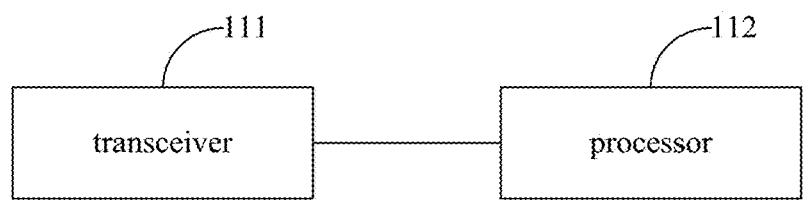
FIG. 11 is schematic view showing another first node according to the present disclosure.

As shown in FIG. 11, the first node includes a transceiver 111 and at least one processor 112 connected to the transceiver 111.

The processor 112 is configured to determine a geographical area corresponding to position information of the first node in accordance with a correspondence between position information and geographical areas of a cell.

The transceiver 111 is configured to report information of the geographical area determined by the processor 112 to a scheduling device.

Each cell is divided into a plurality of geographical areas, and an identical timeslot resource is capable of being shared by the non-adjacent geographical areas in an identical cell, and/or by the non-adjacent geographical areas in different cells.

During the implementation, in a first application scenario, the processor 112 is configured to, in the case that the first node initially accesses a network, determine a first geographical area corresponding to a current position of the first node in accordance with correspondence between the position information and the geographical areas of the cell.

The transceiver 111 is configured to report information of the first geographical area to the scheduling device.

In this scenario, subsequent to reporting the information of the first geographical area to the scheduling device, the transceiver 111 is further configured to receive a timeslot resource allocated by the scheduling device for the first node within the first geographical area.

During the implementation, in a second application scenario, the transceiver 111 is configured to, after the processor 112 determines that the geographical area where the first node is currently located has been changed, report information of a second geographical area to the scheduling device. The second geographical area is a geographical area which is determined by the processor 112 and which is located within an identical cell to the geographical area corresponding to the current position of the first node and to which the first node is to be switched, or a geographical area in an identical cell to which the first node has been switched.

Further, subsequent to reporting the information of the second geographical area to the scheduling device, the transceiver 111 is further configured to receive a timeslot resource allocated by the scheduling device for the first node within the second geographical area.

In this scenario, in the case that the second geographical area is a geographical area which is determined by the processor 112 and which is located within an identical cell to the geographical area corresponding to the current position of the first node and to which the first node is to be switched, the processor 112 is further configured to, before the first node has been switched to the second geographical area, use the timeslot resources which have been allocated by the scheduling device for the first node within the geographical area where the first node is currently located, and after the first node has been switched to the second geographical area, use the timeslot resource allocated by the scheduling device for the first node within the second geographical area.

The transceiver 111 is further configured to send to the scheduling device a message for notifying the scheduling device that the first node has been switched to the second geographical area.

During the implementation, in a third application scenario, the processor 112 is further configured to determine that the first node needs to leave a cell where the first node is currently located, and release the timeslot resource allocated by the scheduling device for the first node within the corresponding geographical area before the switching.

The transceiver 111 is further configured to, after the processor 112 determines that the first node needs to leave the cell where the first node is currently located, send a first notification message to the scheduling device. The first notification message is used to notify the scheduling device that the first node is to leave the cell where the first node is currently located.

During the implementation, in a fourth application scenario, the processor 112 is further configured to determine that the first node needs to be shut down, and release the timeslot resource allocated by the scheduling device for the first node within the geographical area corresponding to the current position of the first node.

The transceiver 111 is further configured to, after the processor 112 determines that the first node needs to be shut down, send a second notification message to the scheduling device. The second notification message is used to notify the scheduling device that the first node is about to be shut down.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc Read-Only Memory (CD-ROM) and optical memory) including computer-readable program codes.

The present disclosure is described with reference to the flow charts and/or block diagrams showing the method, device (system) and computer program product according to the embodiments of the present disclosure. It should be appreciated that each process and/or block, or combinations thereof, in the flow charts and/or block diagrams may be implemented via computer program commands. These computer program commands may be applied to a general-purpose computer, a special-purpose computer, an embedded processor or any other processor of programmable data processing equipment, so as to form a machine, thereby to obtain the means capable of effecting the functions specified in one or more processes in the flow charts and/or one or more blocks in the block diagrams in accordance with the commands executed by the computer or the processor of the other programmable data processing equipment.

These computer program commands may also be stored in a computer-readable memory capable of guiding the computer or the other programmable data processing equipment to work in a special manner, so as to form a product including a command device capable of effecting the functions specified in one or more processes in the flow charts and/or one or more blocks in the block diagrams.

These computer program commands may also be loaded onto a computer or the other programmable data processing equipment, so as to perform a series of operations thereon and generate the processings implemented by the computer, thereby to provide the steps capable of effecting the functions specified one or more processes in the flow charts and/or one or more blocks in the block diagrams in accordance with the instructions.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

It is apparent that those skilled in the art can make various modifications and variations to embodiments of the present disclosure without departing from the principle/spirit of the present disclosure. The present disclosure is intended to cover these modifications and variations provided that fall in the protected scope defined by the following claims or their equivalents.

What is claimed is:

1. A method for scheduling resources in an internet of vehicles system, comprising steps of:
   receiving, by a scheduling device, information of a geographical area reported by a first node and corresponding to the first node; and
   determining, by the scheduling device, timeslot resources capable of being scheduled within the geographical area reported by the first node, and allocating a timeslot resource from the determined timeslot resources for the first node;
   wherein each cell is divided into a plurality of geographical areas, and an identical timeslot resource is capable of being shared by non-adjacent geographical areas in an identical cell, and/or by non-adjacent geographical areas in different cells;
   wherein the step of receiving, by the scheduling device, the information of the geographical area reported by the first node and corresponding to the first node comprises:
   receiving, by the scheduling device, information of a first geographical area reported by the first node, the first geographical area being a geographical area where the first node is located when the first node initially accesses a network;
   the step of determining, by the scheduling device, the timeslot resources capable of being scheduled within the geographical area reported by the first node, and allocating the timeslot resource from the determined timeslot resources for the first node comprises:
   determining, by the scheduling device, a resource set corresponding to the first geographical area in accordance with a correspondence between geographical areas of the cell and resource sets, and allocating at least one timeslot resource in an idle state from the timeslot resources included in the resource set corresponding to the first geographical area for the first node; the resource sets corresponding to the geographical areas of each cell, which do not share the same timeslot resource, including different timeslot resources; or,
   determining, by the scheduling device, a third geographical area closest to the first geographical area and capable of sharing the same timeslot resource with the first geographical area in accordance with the first geographical area, and allocating at least one timeslot resource from timeslot resources configured by the internet of vehicles system and not occupied by nodes within geographical areas between the first geographical area and the third geographical area for the first node;
   wherein the step of allocating, by the scheduling device, at least one timeslot resource from the timeslot resources configured by the internet of vehicles system and not occupied by the nodes within the geographical areas between the first geographical area and the third geographical area for the first node comprises:
   in the case that at least one geographical area of the geographical areas between the first geographical area and the third geographical area does not belong to the scheduling device, acquiring, by the scheduling device, timeslot resources occupied by nodes within the at least one geographical area through interaction with a scheduling device to which the at least one geographical area belongs;
   wherein the resource sets of adjacent geographical areas of each cell are orthogonal with each other.

2. The method according to claim 1, wherein the first geographical area is an area of an actual or geographical position where the first node is located.

3. A method for scheduling resources in an internet of vehicles system, comprising steps of:
   receiving, by a scheduling device, information of a geographical area reported by a first node and corresponding to the first node; and
   determining, by the scheduling device, timeslot resources capable of being scheduled within the geographical area reported by the first node, and allocating a timeslot resource from the determined timeslot resources for the first node;
   wherein each cell is divided into a plurality of geographical areas, and an identical timeslot resource is capable of being shared by non-adjacent geographical areas in an identical cell, and/or by non-adjacent geographical areas in different cells,
   the step of receiving, by the scheduling device, the information of the geographical area reported by the first node and corresponding to the first node comprises: receiving, by the scheduling device, information of a second geographical area reported by the first node, the second geographical area being a geographical area which is determined by the first node and which is located within an identical cell to the geographical area corresponding to a current position of the first node and to which the first node is to be switched, or a geographical area in an identical cell to which the first node has been switched; and
   the step of determining, by the scheduling device, the timeslot resources capable of being scheduled within the geographical area reported by the first node and determining the timeslot resource from the determined timeslot resource for the first node comprises: determining, by the scheduling device, timeslot resources capable of being scheduled within the second geographical area, and allocating a timeslot resource from the timeslot resources capable of being scheduled within the second geographical area for the first node in accordance with a predetermined rule;
   wherein the step of allocating, by the scheduling device, the timeslot resource from the timeslot resources capable of being scheduled within the second geographical area for the first node in accordance with the predetermined rule comprises:
   determining, by the scheduling device, a resource set corresponding to the second geographical area in accordance with a correspondence between geographical areas of the cell and resource sets, and allocating at least one timeslot resource in an idle state from the timeslot resources included in the resource set corresponding to the second geographical area for the first node; the resource sets corresponding to the geographical areas of each cell, which do not share the same timeslot resource, including different timeslot resources; or,
   determining, by the scheduling device, a fourth geographical area closest to the second geographical area and capable of sharing the same timeslot resource with the second geographical area in accordance with the second geographical area, and determining whether or not the first node is capable of using the timeslot resource occupied by the first node within the second geographical area in accordance with the timeslot resources occupied by nodes within geographical areas between the second geographical area and the fourth geographical area;

wherein the step of determining, by the scheduling device, whether or not the first node is capable of using the timeslot resource occupied by the first node within the second geographical area in accordance with the timeslot resources occupied by the nodes within the geographical areas between the second geographical area and the fourth geographical area comprises:

in the case that a timeslot resource currently occupied by the first node has been occupied by the nodes within the geographical areas between the second geographical area and the fourth geographical area, determining, by the scheduling device, that the timeslot resource currently occupied by the first node is incapable of being used by the first node within the second geographical area, and allocating at least one timeslot resource from timeslot resource configured by the internet of vehicles system and not occupied by the nodes within the geographical areas between the second geographical area and the fourth geographical area for the first node; or, in the case that the timeslot resource currently occupied by the first node has not been occupied by the nodes within the geographical areas between the second geographical area and the fourth geographical area, determining, by the scheduling device, that the first node is capable of using the timeslot resource currently occupied by the first node within the second geographical area;

wherein the step of allocating, by the scheduling device, at least one timeslot resource from the timeslot resources configured by the internet of vehicles system and not occupied by the nodes within the geographical areas between the second geographical area and the fourth geographical area for the first node comprises:

in the case that at least one geographical area of the geographical areas between the second geographical area and the fourth geographical area does not belong to the scheduling device, acquiring, by the scheduling device, timeslot resources occupied by nodes within the at least one geographical area through interaction with a scheduling device to which the at least one geographical area belongs;

wherein the resource sets of adjacent geographical areas of each cell are orthogonal with each other.

4. The method according to claim 3, wherein when the second geographical area is a geographical area located within an identical cell to the geographical area corresponding to a current position of the first node and to which the first node is to be switched, subsequent to the step of allocating, by the scheduling device the timeslot resource for the first node, the method further comprises:

upon receiving, from the first node, a message that the first node has been switched to the second geographical area, updating, by the scheduling device, the timeslot resource currently occupied by the first node to a timeslot resource newly allocated for the first node by the scheduling device, and setting a state of the timeslot resource previously occupied by the first node within a previous geographical area corresponding to the first node into an idle state.

5. The method according to claim 3, further comprising:
receiving, by the scheduling device, from the first node a first notification message that the first node is to leave a cell where the first node is currently located; and modifying, by the scheduling device, a state of the timeslot resource used by the first node within the geographical area of the cell where the first node is located before the switching into an idle state in accordance with the first notification message.

6. The method according to claim 3, further comprising:
receiving, by the scheduling device, from the first node a second notification message that the first node is to be shut down; and modifying, by the scheduling device, a state of the timeslot resource used by the first node within the geographical area of the cell corresponding to a current position of the first node into an idle state in accordance with the second notification message.

7. The method according to claim 3, wherein the first geographical area is an area of an actual or geographical position where the first node is located, and the second geographical area is an area of an actual or geographical position to which the first node is to be switched or has been switched.

8. A method for scheduling resources in an internet of vehicles system, comprising steps of:

determining, by a first node in the internet of vehicles system, a geographical area corresponding to position information of the first node in accordance with a correspondence between position information and geographical areas of a cell; and reporting, by the first node, information of the determined geographical area to a scheduling device;

wherein each cell is divided into a plurality of geographical areas, and an identical timeslot resource is capable of being shared by non-adjacent geographical areas in an identical cell, and/or by non-adjacent geographical areas in different cells; wherein the step of reporting, by the first node, the information of the determined geographical area to the scheduling device comprises:

after the first node determines that the geographical area where the first node is currently located has been changed, reporting, by the first node, information of a second geographical area to the scheduling device; the second geographical area being a geographical area which is determined by the first node and which is located within an identical cell to the geographical area corresponding to the current position of the first node and to which the first node is to be switched, or a geographical area in an identical cell to which the first node has been switched; wherein, subsequent to the step of reporting, by the first node, the information of the second geographical area to the scheduling device, the method further comprises:

receiving, by the first node, a timeslot resource allocated by the scheduling device for the first node within the second geographical area;

wherein the method further comprises:

after the first node determines to be shut down, sending, by the first node, a second notification message to the scheduling device, and releasing the timeslot resource allocated by the scheduling device for the first node within the geographical area corresponding to the current position of the first node, and wherein the second notification message is to notify the scheduling device that the first node is to be shut down.

9. The method according to claim 8, wherein when the second geographical area is a geographical area which is determined by the first node and which is located within an identical cell to the geographical area corresponding to the current position of the first node and to which the first node is to be switched, subsequent to the step of receiving, by the first node, the timeslot resource allocated by the scheduling device for the first node within the second geographical area, the method further comprises:

before the first node has been switched to the second geographical area, using, by the first node, the timeslot resources which have been allocated by the scheduling device for the first node within the geographical area where the first node is currently located; and after the first node has been switched to the second geographical area, using, by the first node, the timeslot resource allocated by the scheduling device for the first node within the second geographical area, and sending to the scheduling device a message for notifying the scheduling device that the first node has been switched to the second geographical area.

10. The method according to claim 8, further comprising:
after the first node determines to leave a cell where the first node is currently located, sending, by the first node, a first notification message to the scheduling device, and releasing the timeslot resource allocated by the scheduling device for the first node within the corresponding geographical area before the switching,
wherein the first notification message is to notify the scheduling device that the first node is to leave the cell where the first node is currently located.

11. The method according to claim 8, wherein the second geographical area is an area of an actual or geographical position to which the first node is to be switched or has been switched.

12. A scheduling device in an internet of vehicles system, comprising:
a memory and a processor configured to read a program stored in the memory so as to:
receive information of a geographical area reported by a first node and corresponding to the first node; and
determine timeslot resources capable of being scheduled within the geographical area reported by the first node, and allocate a timeslot resource from the determined timeslot resources for the first node;
wherein each cell is divided into a plurality of geographical areas, and an identical timeslot resource is capable of being shared by non-adjacent geographical areas in an identical cell, and/or by non-adjacent geographical areas in different cells;
receive information of a first geographical area reported by the first node, the first geographical area being a geographical area where the first node is located when the first node initially accesses a network;
determine a resource set corresponding to the first geographical area in accordance with a correspondence between geographical areas of the cell and resource sets, and allocating at least one timeslot resource in an idle state from the timeslot resources included in the resource set corresponding to the first geographical area for the first node; the resource sets corresponding to the geographical areas of each cell, which do not share the same timeslot resource, including different timeslot resources; or,
determine a third geographical area closest to the first geographical area and capable of sharing the same timeslot resource with the first geographical area in accordance with the first geographical area, and allocating at least one timeslot resource from timeslot resources configured by the internet of vehicles system and not occupied by nodes within geographical areas between the first geographical area and the third geographical area for the first node;
wherein the processor is further configured to read the program stored in the memory to:
in the case that at least one geographical area of the geographical areas between the first geographical area and the third geographical area does not belong to the scheduling device, acquire timeslot resources occupied by nodes within the at least one geographical area through interaction with a scheduling device to which the at least one geographical area belongs; and
wherein the resource sets of adjacent geographical areas of each cell are orthogonal with each other.

13. The device according to claim 12, wherein the first geographical area is an area of an actual or geographical position where the first node is located.

14. A first node in an internet of vehicles system, comprising:
a memory and a processor configured to read a program stored in the memory so as to:
determine a geographical area corresponding to position information of the first node in accordance with a correspondence between position information and geographical areas of a cell; and
report information of the geographical area determined by the determination module to a scheduling device;
wherein each cell is divided into a plurality of geographical areas, and an identical timeslot resource is capable of being shared by non-adjacent geographical areas in an identical cell, and/or by non-adjacent geographical areas in different cells;
determine, when the first node initially accesses a network, a first geographical area corresponding to a current position of the first node in accordance with correspondence between the position information and the geographical areas of the cell; and
report, information of the first geographical area to the scheduling device;
receive, a timeslot resource allocated by the scheduling device for the first node within the first geographical area, subsequent to the step of reporting, by the first node, the information of the first geographical area to the scheduling device;
wherein the processor is further configured to read the program stored in the memory to:
after the first node determines to be shut down, send a second notification message to the scheduling device, and release the timeslot resource allocated by the scheduling device for the first node within the geographical area corresponding to the current position of the first node, and
wherein the second notification message is to notify the scheduling device that the first node is to be shut down.

15. A method for scheduling resources in an internet of vehicles system, comprising steps of:
determining, by a first node in the internet of vehicles system, a geographical area corresponding to position information of the first node in accordance with a correspondence between position information and geographical areas of a cell; and
reporting, by the first node, information of the determined geographical area to a scheduling device;
wherein each cell is divided into a plurality of geographical areas, and an identical timeslot resource is capable of being shared by non-adjacent geographical areas in an identical cell, and/or by non-adjacent geographical areas in different cells;

the step of determining, by the first node, the geographical area corresponding to the position information of the first node in accordance with the correspondence between the position information and the geographical areas of the cell comprises: determining, by the first node when the first node initially accesses a network, a first geographical area corresponding to a current position of the first node in accordance with correspondence between the position information and the geographical areas of the cell; and the step of reporting, by the first node, the information of the determined geographical area to the scheduling device comprises: reporting, by the first node, information of the first geographical area to the scheduling device;

subsequent to the step of reporting, by the first node, the information of the first geographical area to the scheduling device, the method further comprises:

receiving, by the first node, a timeslot resource allocated by the scheduling device for the first node within the first geographical area;

wherein the method further comprises:

after the first node determines to be shut down, sending, by the first node, a second notification message to the scheduling device, and releasing the timeslot resource allocated by the scheduling device for the first node within the geographical area corresponding to the current position of the first node, and wherein the second notification message is to notify the scheduling device that the first node is to be shut down.

* * * * *